Patented Oct. 14, 1941

2,259,064

UNITED STATES PATENT OFFICE 2,259,064

PREPARATION OF COMPLEX DIARYL GUANIDINE METAL SALT ADDITION PRODUCTS

Arnold R. Davis, Old Greenwich, Conn., assignor to American Cyanamid Company, New York, N. Y., a corporation of Maine No Drawing. Application August 3, 1940,
Serial No. 351,157

4 Claims. (Cl. 260—429)

This invention relates to the production of complex addition compounds of a diaryl guanidine and certain metal salts. More particularly, it relates to a modified fusion process for the production of the complex diaryl guanidine addition compounds of the chloride and sulfate of zinc, of aluminum, and of cadmium and of the chlorides of tin.

In my copending application, Serial No. 351,156, filed concurrently herewith, I have described and claimed a fusion process for the preparation of the above-described complex addition compounds and also these complex addition compounds as products. The present invention constitutes an improvement on the fusion process therein described and broadly stated it consists in so modifying this fusion process that the presence of unreacted crystalline metal salt in the complex addition product is avoided.

In accordance with the present invention I have found that when the metal salt is first placed in solution in water, preferably in the minimum of water necessary to dissolve the salt, and this solution and the diaryl guanidine then heated to fusion to obtain the complex addition products described above, the presence of unreacted crystalline metal salt in the fusion product is avoided. This is of advantage when a glassy amorphous fusion product is obtained which is intended to be employed as a delayed action activator in the vulcanization of rubber, since crystalline material tends to give an uneven cure of the rubber at the point where the crystals are present. In my copending application, Serial No. 223,206, filed August 5, 1938, I have described and claimed a process employing the complex diaryl guanidine-zinc chloride addition products as delayed action activators for the diaryl guanidine activatable accelerators.

The following examples will illustrate my invention, to which however it is not intended that it be limited and in which the parts are by weight.

Example 1

28.76 parts (1 mol) of zinc sulfate as $ZnSO_4.7H_2O$ were dissolved in water by heating to 64° C. Then 42.26 parts (2 mols) of diphenyl guanidine were added to the solution and the mixture heated to fusion. During the heating, water was given off and the mass thickened and after 40 minutes a somewhat glassy product was formed which had a softening point of 130° C.

Example 2

27.26 parts (1 mol) of zinc chloride were dissolved in 10 parts of water and 95.68 parts (2 mols) of di-o-tolyl guanidine were added. The materials were then heated while stirring for 52 minutes to a maximum temperature of 160° C. Most of the water appeared to have been driven off upon reaching 120° C., so that there was very little foam at the time when 140° C. was reached. The fusion product was poured onto tin foil to cool and the cool film was a clear pinkish-colored glassy resin.

The complex diaryl guanidine addition compounds of aluminum chloride, aluminum sulfate, cadmium chloride and cadmium sulfate, stannous chloride and stannic chloride may be prepared in the manner described in the preceding examples by the mere substitution of the equivalent quantity of these salts for the salts used in the examples.

What I claim is:

1. The process of preparing complex addition compounds of a diaryl guanidine and a metal salt of the group consisting of the chlorides and sulfates of zinc, aluminum and cadmium and the chlorides of tin which comprises, dissolving the metal salt in water, adding the diaryl guanidine in solid form thereto, and heating the mixture to fusion.

2. The process of preparing amorphous complex addition compounds of a diaryl guanidine and zinc chloride which comprises, dissolving the zinc chloride in water, adding the diaryl guanidine in solid form thereto, and heating the mixture to fusion.

3. The process of claim 2, in which the diaryl guanidine is di-o-tolyl guanidine.

4. The process of preparing complex addition compounds of a diaryl guanidine and cadmium chloride which comprises, dissolving the cadmium chloride in water, adding the diaryl guanidine in solid form thereto, and heating the mixture to fusion.

ARNOLD R. DAVIS.